Figure 2:
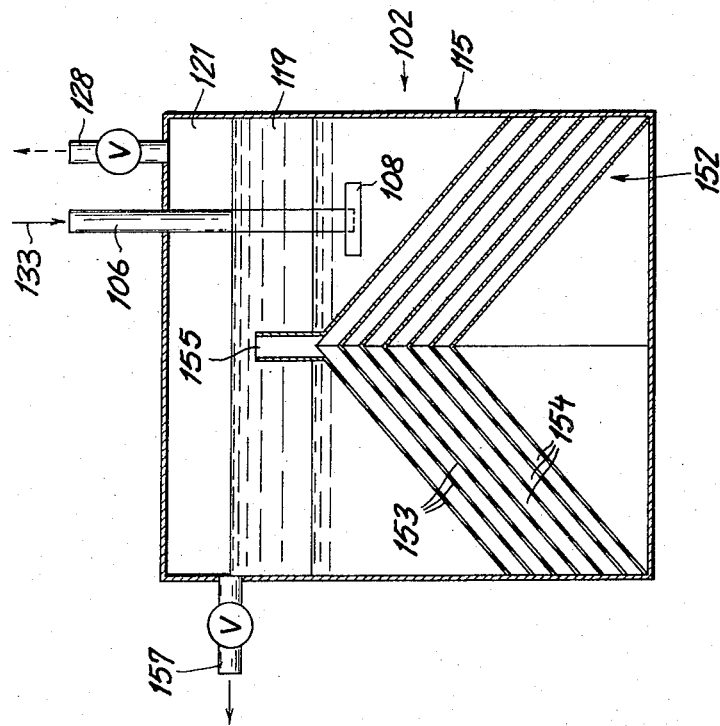

United States Patent [19]
Jakubek

[11] 3,849,311
[45] Nov. 19, 1974

[54] DEVICE FOR REMOVING OIL AND THE LIKE FROM WATER CONTAMINATED BY OIL OR THE LIKE

[75] Inventor: Peter Jakubek, Brunn am Gebirge, Austria

[73] Assignee: Fa. International Pollution Control Systems, Inc., Washington, D.C.

[22] Filed: Dec. 1, 1972

[21] Appl. No.: 311,264

[30] Foreign Application Priority Data
Dec. 1, 1971   Austria .............................. 10355/71

[52] U.S. Cl.................. 210/188, 210/301, 210/513, 210/521, 210/532, 210/537, 210/538, 210/539, 210/540, 210/DIG. 21
[51] Int. Cl............................................ B01d 19/00
[58] Field of Search .. 210/23, 301, 84, 522, DIG. 5, 210/26

[56] References Cited
UNITED STATES PATENTS

| | | | |
|---|---|---|---|
| 386,114 | 7/1888 | Donahue............................ | 210/522 |
| 1,661,284 | 3/1928 | Fugua et al. ....................... | 210/301 |
| 1,897,240 | 2/1933 | Dahlgren ............................ | 210/84 |
| 2,573,615 | 10/1951 | Seailles ................................ | 210/84 |
| 3,482,694 | 12/1969 | Rice et al............................ | 210/522 |
| 3,529,728 | 9/1970 | Middelbeck et al. ................ | 210/522 |

Primary Examiner—Frank A. Spear, Jr.
Assistant Examiner—Ferris H. Lander
Attorney, Agent, or Firm—Ernest G. Montague; Karl F. Ross; Herbert Dubno

[57] ABSTRACT

An apparatus for removing oil or the like from water, which is contaminated with oil or the like, particularly from ship bilges, which comprises a bilge pump controlled by a float switch. An air separator and an oil separator are provided. A pump member pumps water contaminated with oil via the air separator through the oil separator. The oil separator includes at least one collecting tank for the removed oil. At least one coarse and at least one fine separator of foam are arranged. The coarse separator is connected with the collecting tank which includes a shutoff member. An insert is provided within the coarse separator and separates an inlet from an outlet, as well as has at least one flow channel extending obliquely upwardly, seen in the direction of flow.

8 Claims, 4 Drawing Figures

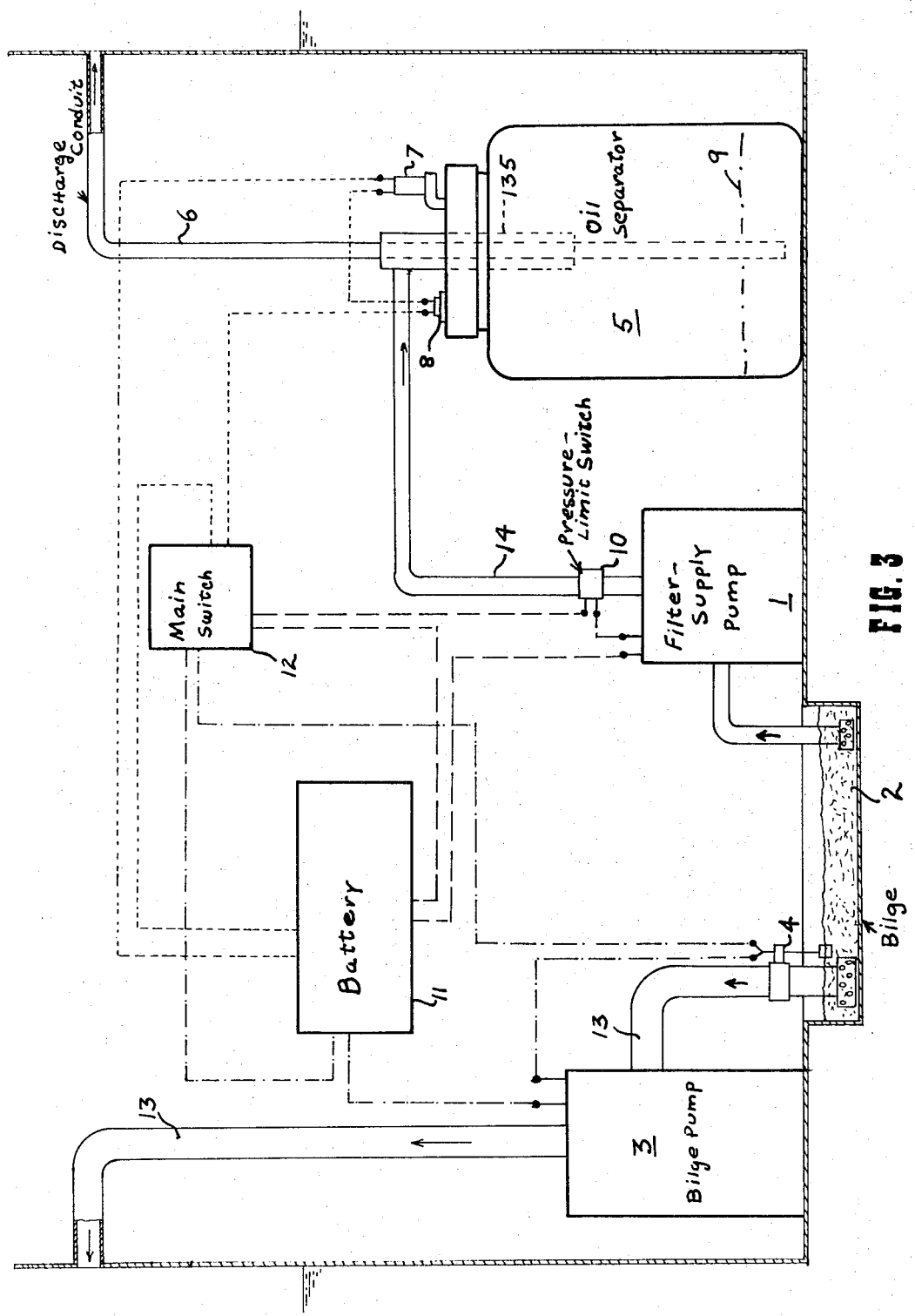

DEVICE FOR REMOVING OIL AND THE LIKE FROM WATER CONTAMINATED BY OIL OR THE LIKE

The present invention relates to a device for removing oil or the like from water contaminated by oil or the like, and particularly from ship bilges by means of a bilge pump which is controlled by a float switch and a pump which pumps oil-contaminated water, possibly via an air separator, through an oil separator, the oil separator comprising at least one collector vessel for the oil removed, at least one coarse separator and at least one fine separator with fine filter of foam, and the coarse separator being connected with the collecting vessel via an oil line which can be shut off by a shutoff member, in accordance with the patent application, Ser. No. 160,779, the disclosure of which is made a part of the present disclosure. The coarse separator described in the prior patent application, Ser. No. 160,779, preferably has a coarse filter of foam which is very heavily loaded, particularly in the case of a large amount of oil. Therefore, one object of the present invention is to provide a coarse separator which even without a coarse filter of foam assures sufficient coarse separation of oil or the like and water.

This object is achieved in accordance with the present invention by the fact that there is provided in the coarse separator an insert which separates the inlet from the outlet and has at least one flow channel extending obliquely upward, as seen in the direction of flow. The water contaminated with oil or the like which flows through the coarse separator is forced to flow through the flow channel, whereby a coarse separation of oil or the like and water takes place which is possibly further promoted by adherence of the oil or the like to the walls of the flow channel.

In accordance with a preferred embodiment, the flow channel has angular limiting walls of roof-ridge shape. As a result of this special shape, assurance is had that the oil in the flow channel will flow into and along the bend and emerge from the channel at one point and that the separating effect will be further increased.

A particularly good separation is also obtained if in accordance with the present invention the limiting walls consist of polymeric halogenated hydrocarbons.

A further improvement in the separation which goes hand in hand with simplified manufacture of the coarse separator is obtained if — in accordance with the present invention — a plurality of limiting walls are combined into separate units.

In order to avoid a clogging of the flow channels, it is furthermore provided in accordance with the present invention that individual limiting walls have holes whose diameters increase in the direction of flow. With this embodiment, the oil which has collected in the channels has the possibility of emerging from the flow channel, whereupon its total cross-section is again available for the flow.

Finally, it can also be provided within the scope of the present invention that an overflow opening for oil or the like which has been removed is provided at the upper end of the uppermost limiting wall. This overflow opening permits the oil removed to flow over into the coarse separator into which the inlet discharges, where it can then combine with the oil layer which has formed therein.

Figure 1:
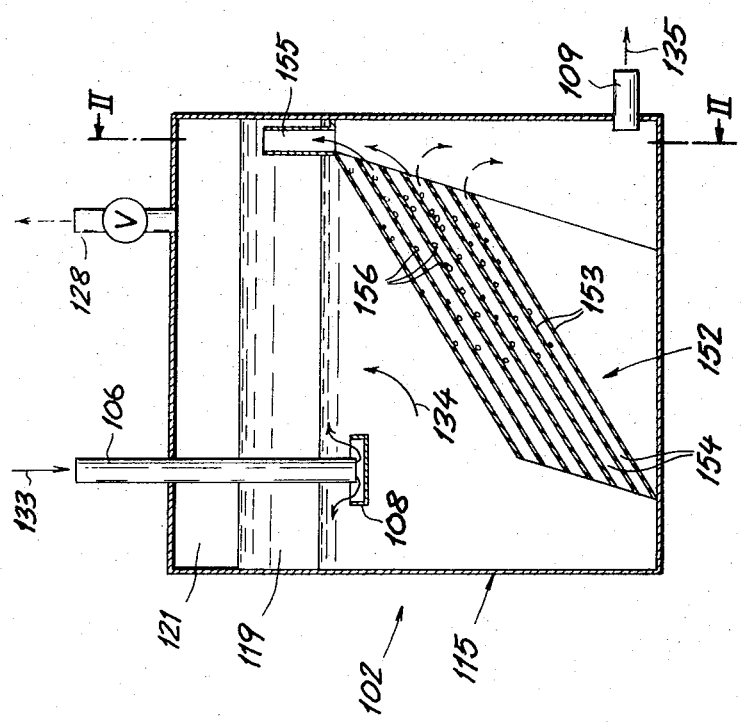
Figure 4:
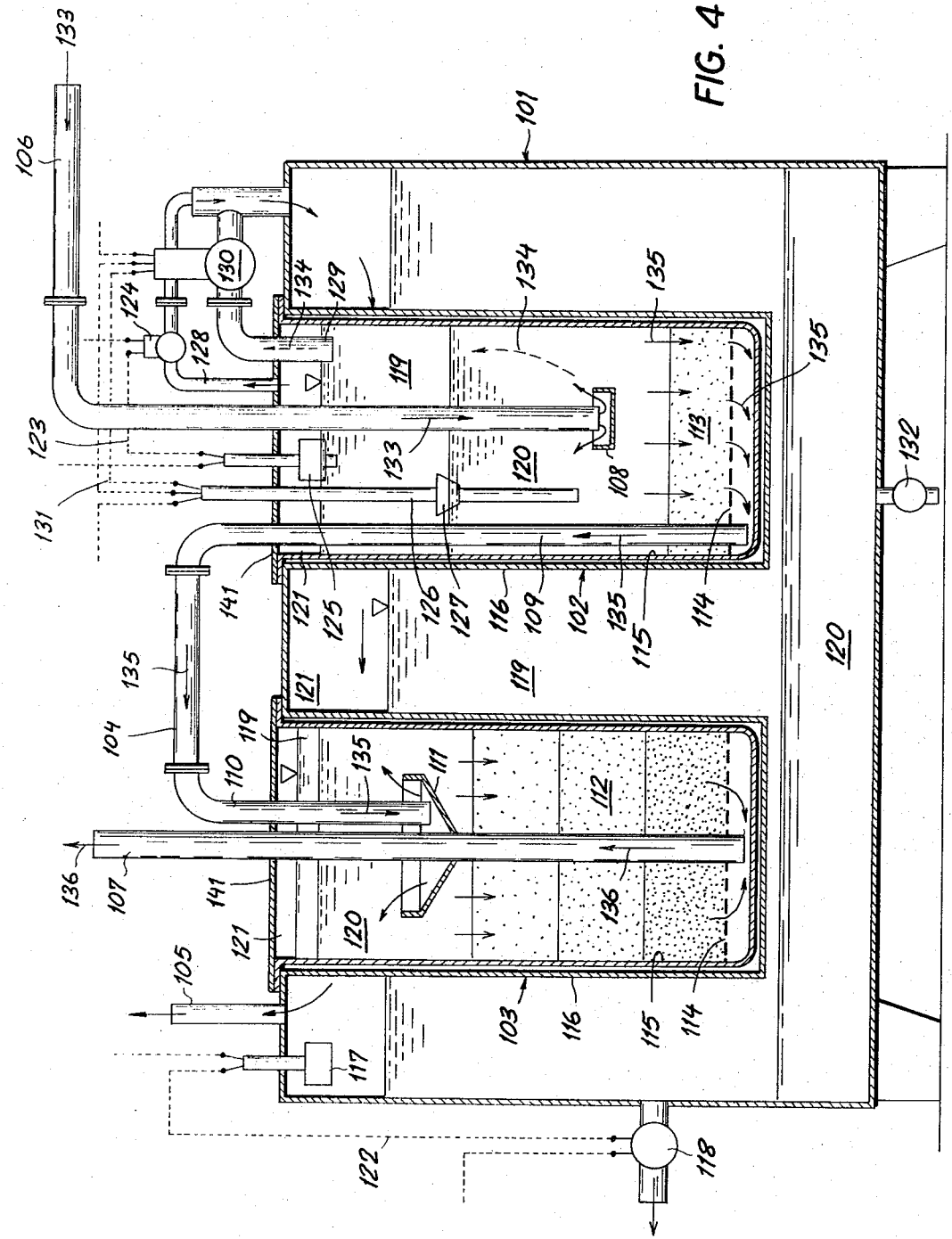

Other advantages and details of the present invention will be described in further detail with reference to the coarse separator shown schematically in the drawing in which FIG. 1 is a cross-section through a coarse separator having an insert in accordance with the present invention, FIG. 2 shows the coarse separator of FIG. 1 in section along the lines II—II of FIG. 1, FIG. 3 is a flow diagram of the overall apparatus (corresponding to FIG. 1 of the aforementioned application Ser. No. 160,779) and FIG. 4 is a vertical section through the apparatus (corresponding to FIG. 9 of the aforementioned application Ser. No. 160,779);

Referring now to the drawing, in the housing 115 of a coarse separator 102, a conduit 106 for bilge water contaminated with oil or the like discharges from above, a baffle plate 108 being provided at the lower end of said conduit. There is furthermore provided in the housing 115 a vent 128 which permits operating the coarse separator 102 either under atmospheric pressure or under a pressure greater than atmospheric. An outlet 109 for coarsely purified water is furthermore provided in the housing 115, the water flowing out of the coarse separator 102 in the direction indicated by the arrow 135. In the coarse separator 102 there is provided an insert 152 which in the embodiment shown by way of example has six flow channels 154 which are formed by limiting walls 153. At the upper end of the uppermost limiting wall 153 there is provided an overflow opening 155. The limiting walls 153 extend from wall to wall of the housing 115 so that liquid flowing through the coarse separator is forced to pass through the channels 154.

Through the inlet conduit 106, oil or the like, water and air flow into the coarse separator 102 in the direction indicated by the arrow 133. In the space of the coarse separator 102 into which the inlet 106 discharges, there takes place a first separation of oil, air and water, oil floating up in the direction indicated by the arrow 134 to an oil layer 119 above which there is furthermore present an air cushion 121. The water and a part of the oil now flow through the channels 154 of the insert 152 within which a further separation takes place. In this connection, a part of the oil adheres to the limiting walls 153 which comprise, for instance, polytetrafluorethylene. The oil in the flow channel 154 now creeps along the ridge-shaped limiting walls 153 upward and after leaving the flow channels 154 passes through the overflow opening 155 into the space of the coarse separator 102 into which the inlet 106 discharges and combines with the oil layer 119 present there. The water, after leaving the flow channels 154, sinks to the bottom and leaves the coarse separator 102 through the outlet 109 as coarsely purified water in the direction indicated by the arrow 135.

When there is a particularly large amount of oil in the bilge water, it is advisable to provide holes 156 in at least some of the limiting walls 153, through which holes the oil which has collected in the channels 154 can flow into the next flow channel 154. Several such holes are preferably provided, their diameters increasing in the direction of flow.

It is furthermore advisable to combine several limiting walls 153 into units. These units permit easier assembly of the coarse separator 102 and the possible replacement of partition walls 153, in order to adapt the coarse separator in optimal fashion to the specific operating conditions. In this way, for instance, units with wider or narrower flow channels 154 or units with a different arrangement and number of holes 156 can be used in simple fashion.

When an oil layer 119 has collected in the coarse separator 102, the oil can be discharged from the coarse separator 102 through an oil outlet 157 in the housing 115. Oil which has been removed is destroyed, for instance burned, either directly or via an oil-collection tank.

The apparatus in which the separator of FIGS. 1 and 2 is used has been shown diagramatically in FIG. 3 to comprise essentially a filter supply pump 1, a bilge pump 3 and an oil separator 5. A main switch 12 is operated to start the bilge pump 3 and the filter supply pump 1. The two pumps first suck oil-free water from the bottom of a bilge 2. To prevent the bilge pump 3 from sucking oil from the surface of the water when the level of water in the bilge 2 drops, a magnetic flow switch is provided which deenergizes the bilge pump in time. If the bilge pump 3 is mechanically coupled to the drive motor, the magnetic float switch may be arranged, e.g., to open a breather valve in the suction portion of a bilge conduit 13 so that the bilge pump 3 cannot suck more water.

Thereafter, only the filter supply pump 1 sucks and handles bilge water and finally the oil floating on the surface through a conduit 14 to the oil separator 5. Water from which oil or the like has been removed is discharged from the ship through a discharge conduit 6 for purified water. The filter supply pump 1 is a small self-priming pump which has a capacity of about 2 to 10 liters per minute depending on the size of the apparatus. Centrifugal pumps should be avoided because they agitate the fluids to form an oil-water emulsion which can be separated only with difficulty. This is not the case with gear or rotary pumps which result in less intense agitation.

A pressure-limiting switch 10 automatically deenergizes the filter supply pump when the pressure in the oil separator 5 exceeds a predetermined value, e.g. because the oil separator is clogged with dirt particles.

The oil separator 5 is tight and resists pressures up to about 2 meters of water for use on small yachts so that it can be placed below the designated waterline as is particularly desirable. All electric components of the apparatus shown in FIG. 3 are energized, e.g. by a battery 11 to which they are connected by a main switch 12.

As can be seen from FIG. 4, the coarse separator is connected to a fine separator in the oil separator system which is represented generally in FIG. 3. Of course, for the purposes of the present invention, the coarse separator is constituted by the device previously described in conjuction with FIGS. 1 and 2.

The coarse separator 102 shown in FIG. 4 comprises the separator housing 115, which is closed by a cover 141, and fittings mounted in the cover 141, such as the supply and discharge conduits for the water to be purified, discharge conduits for oil and air, and two float switches. Specifically, the cover 141 of the coarse separator 102 is provided with a bilge water supply conduit 106, which is provided at its lower end with a baffle plate 108, moreover, a discharge conduit 109 for coarsely purified water, an air-venting conduit provided with a shut-off valve 124, an oil discharge conduit 129, which is adapted to be shut off by a solenoid valve 130, and two float switches 125 and 126.

The magnetic float switch 125 is connected by conduit 123 with the air discharge valve 124. The air-venting conduit 128 opens into the oil-collecting container 101. The oil conduit 129 opens also into the oil-collecting conduit 101, which contains a solenoid valve 130 that is also controlled by the float switch 126. The float switch 126 comprises a densimetric float 127. During operation, the coarse separator 102 contains an oil layer 119, which floats on a water layer 120, and an air cushion 121 disposed over the oil layer 119. The densimetric float 127 of the float switch 126 is trimmed to float between the oil layer 119 and the water layer 120. The float of the solenoid switch 125 floats on the oil layer 119. The separator housing 115 of the coarse separator 102 contains a coarse filter 113, which is carried by a screen bottom 114. Just as the coarse separator 102, the fine separator 103 consists of the separator housing 115 and the cover 141. A supply conduit 110 for prepurified water opens from above into the fine separator. A baffle plate 111 is provided to avoid a direct flow of the water against a filter 112, which is contained in the fine separator 103. The filter 112 in the fine separator 103 has various pore sizes, and the pore size may decrease in a downward direction. The filter 112 may consist, e.g., of three layers having different pore sizes. Alternatively, filters 112 may be composed of more or less than three layers having different pore sizes.

The filter material for the filters 112 and 113 consists preferably of the foam which has been described hereinbefore.

The fine separator 103 comprises also a screen bottom 114, which carries the foam filter 112, and a discharge conduit 107 for the now purified water. During the operation of the oil separator, the fine separator 103 contains a water layer 120, which is disposed over the filter layer 112, a small oil layer 119 floating on the water layer 120, and an aircushion 121 on top.

The oil separator according to the invention has the following mode of operation:

Bilge water which is contaminated with oil or the like and which may contain entrained air is supplied through the conduit 6 in the direction of arrows 133 into the coarse separator 102. A first separation into the water level 120, the oil level 119 and the air cushion 121 is effected in the coarse separator 102. Under the pressure of the bilge water which is contaminated with oil or the like and which is subsequently supplied, and under the force of gravity, prepurified water flows in the direction of arrows 135 through the coarse filter 113 and leaves the coarse separator through the discharge conduit 109. The prepurified water than flows in the direction of the arrows 135 through a transfer conduit 104 between the coarse separator 102 and the fine separator 103 and through the supply conduit 110 into the fine separator 103. A further separation into the water layer 120 and the oil layer 119 is effected in the upper part of the fine separator 103. Under the pressure of the prepurified water which is subsequently supplied and under the force of gravity, the water layer 120 flows through the filter 112 and is discharged from the ship through the discharge conduit 107 in the direction of the arrow 136. The oil layer 119 in the coarse separator 102 grows continuously so that the densimetric float 127 floating between the oil layer 119 and the water layer 120 descends. The solenoid switch 126, which controls the solenoid valve 130 through conduit 131, defines two limits. The solenoid valve 130 is opened at the lower limit and is closed at the upper limit. When the float 127 has reached the lower limit defined by the float switch 126, the solenoid valve 130 is opened and oil can flow through the oil discharge conduit 129 in the direction of arrow 134 into the oil-collecting container 101.

This is continued until the float 127 reaches the upper limit for the float switch 126 and the solenoid valve 130 is closed.

The magnetic float switch 125 controls in a similar manner the air-venting valve 124 in the air conduit 128. As a result, any air which is entrained by the bilge water is vented through the conduit 128, the oil-collecting container 101, and the venting conduit 105 so that the air cushion 121 in the coarse separator 102 cannot grow beyond a predetermined size.

While we have disclosed several embodiments of the present invention, it is to be understood that these embodiments are given by example only and not in a limiting sense.

I claim:

1. An apparatus for removing oil or the like from water which is contaminated with oil or the like, particularly from ship bilges, comprising
    a bilge pump controlled by a float switch,
    an air separator and an oil separator operatively communicating with each other,
    a pump means for pumping water contaminated with oil via said air separator through said oil separator, said oil separator comprising at least one collecting tank for the removed oil, and at least one coarse separator and at least one fine separator, the latter including foam,
    said coarse separator communicating with said collecting tank by a shutoff member, and including an insert provided within said coarse separator and separating an inlet portion thereof from an outlet portion thereof comprising at least one flow channel extending obliquely upwardly in the direction of flow.

2. The apparatus, as set forth in claim 1, wherein said flow channel has limiting walls which are bent in the shape of a roof ridge at said outlet portion and which abut the walls of said coarse separator at said inlet portion.

3. The apparatus, as set forth in claim 2, wherein said limiting walls comprise a polymeric halogenated hydrocarbon.

4. The apparatus, as set forth in claim 2, wherein a plurality of said limiting walls are combined into units.

5. The apparatus, as set forth in claim 4, wherein individual of said limiting walls have holes, the upwardly diameters of which increase in the direction of flow.

6. The apparatus, as set forth in claim 5, wherein an overflow opening for separated oil is provided at the upper end of an uppermost of said limiting walls.

7. A coarse oil-water separator, comprising
    a tank, having tank walls,
    an inlet to said tank,
    a separated oil outlet communicating with said tank, a coarsely purified water outlet communicating with said tank and disposed below said oil outlet,
    an insert means separating said inlet from said outlets and comprising a plurality of limiting walls defining channels and extending upwardly in two groupings from and abutting two portions, respectively, of said tank walls at a bottom portion thereof and thereat communicating with said inlet, said two groupings meeting at an upper portion and forming a roof-like apex operatively communicating thereat with said oil outlet and the coarsely purified water, said separated oil emerging from said channels at said apex by creeping upwardly in said channels.

8. The separator, as set forth in claim 7, further comprising
    an overflow opening for separated oil provided at the upper end of an uppermost of said limiting walls.

* * * * *